(12) United States Patent
Le Gall et al.

(10) Patent No.: US 7,144,071 B2
(45) Date of Patent: Dec. 5, 2006

(54) MULTI SEGMENT PARTS

(75) Inventors: Eric Le Gall, Strasbourg (FR);
Jean-Philippe Lutz, Strasbourg (FR);
Serge Bieber, Haegen (FR); Denis Souvay, Illkirch Graffenstaden (FR)

(73) Assignee: L&L Products, Inc., Romeo, MI (US)

( * ) Notice: Subject to any disclaimer, the term of this patent is extended or adjusted under 35 U.S.C. 154(b) by 367 days.

(21) Appl. No.: 10/430,964

(22) Filed: May 6, 2003

(65) Prior Publication Data

US 2003/0218019 A1 Nov. 27, 2003

(30) Foreign Application Priority Data

May 23, 2002 (GB) ................ 0211775.2

(51) Int. Cl.
*B60R 21/02* (2006.01)
*B60R 27/00* (2006.01)

(52) U.S. Cl. ............ 296/187.02; 296/187.03; 296/193.06; 52/735.1

(58) Field of Classification Search .......... 428/36.5; 296/187.02, 203.01; 52/232, 717.03, 309.4, 52/404.1, 211, 309.1, 287.1, 716.5, 716.6, 52/716.1

See application file for complete search history.

(56) References Cited

U.S. PATENT DOCUMENTS

| | | | |
|---|---|---|---|
| 2,156,681 A * | 5/1939 | Dewhirst et al. ............. 404/65 |
| 2,204,622 A * | 6/1940 | Reid .......................... 156/79 |
| 2,230,688 A * | 2/1941 | Irwin ........................ 404/65 |
| 3,258,890 A * | 7/1966 | Dirkse ....................... 52/309.9 |
| 3,378,958 A * | 4/1968 | Parks et al. ............... 49/489.1 |
| 3,400,182 A | 9/1968 | Kolt |
| 3,615,974 A | 10/1971 | Graff |
| 3,923,411 A * | 12/1975 | Berghman ................... 404/64 |
| 4,397,914 A * | 8/1983 | Miura et al. ................ 428/43 |
| 4,463,870 A | 8/1984 | Coburn, Jr. et al. |
| 4,598,008 A | 7/1986 | Vogt et al. |
| 4,610,836 A | 9/1986 | Wycech |
| 4,610,907 A * | 9/1986 | Elvira ....................... 428/122 |
| 4,646,499 A * | 3/1987 | Wilson ....................... 52/408 |
| 4,751,249 A | 6/1988 | Wycech |
| 4,769,391 A | 9/1988 | Wycech |
| 4,769,951 A | 9/1988 | Kaaden |
| 4,783,931 A * | 11/1988 | Kirkwood .................... 49/441 |
| 4,810,548 A | 3/1989 | Ligon, Sr. et al. |
| 4,813,690 A | 3/1989 | Coburn, Jr. |
| 4,822,011 A | 4/1989 | Goldbach et al. |
| 4,836,516 A | 6/1989 | Wycech |
| 4,853,270 A | 8/1989 | Wycech |

(Continued)

FOREIGN PATENT DOCUMENTS

DE 38 38 655 5/1990

(Continued)

OTHER PUBLICATIONS

Hopton et al, Application of a Structural Reinforcing Material to Improve Vehicle NVH Characteristics, Sep. 1999 6 pages.

(Continued)

*Primary Examiner*—Robert Canfield
(74) *Attorney, Agent, or Firm*—Dobrusin & Thennisch PC

(57) ABSTRACT

A part for reinforcement of hollow structures comprises a series of segments flexibly interlinked to enable the part to be adjusted to fit structures of irregular cross section and direction, the segments contain foamable material which can be activated to fill the space between the parts and the hollow structure.

38 Claims, 2 Drawing Sheets

U.S. PATENT DOCUMENTS

| | | | |
|---|---|---|---|
| 4,861,097 A | 8/1989 | Wycech | |
| 4,884,381 A * | 12/1989 | Betti | 52/741.4 |
| 4,923,902 A | 5/1990 | Wycech | |
| 4,978,562 A | 12/1990 | Wycech | |
| 4,979,846 A * | 12/1990 | Hill et al. | 404/65 |
| 4,984,406 A | 1/1991 | Friesen | |
| 4,996,090 A * | 2/1991 | Steinke et al. | 428/71 |
| 5,124,186 A | 6/1992 | Wycech | |
| 5,288,538 A | 2/1994 | Spears | |
| 5,305,552 A * | 4/1994 | Guillon | 49/490.1 |
| 5,358,397 A | 10/1994 | Ligon et al. | |
| 5,382,397 A | 1/1995 | Turner, Jr. | |
| 5,506,025 A | 4/1996 | Otto et al. | |
| 5,531,455 A * | 7/1996 | Calixto | 277/646 |
| 5,631,027 A | 5/1997 | Takabatake | |
| 5,642,914 A | 7/1997 | Takabatake | |
| 5,755,486 A | 5/1998 | Wycech | |
| 5,766,719 A | 6/1998 | Rimkus | |
| 5,806,915 A | 9/1998 | Takabatake | |
| 5,819,408 A | 10/1998 | Catlin | |
| 5,851,626 A * | 12/1998 | McCorry et al. | 428/95 |
| 5,888,600 A | 3/1999 | Wycech | |
| 5,904,024 A | 5/1999 | Miwa | |
| 5,985,435 A | 11/1999 | Czaplicki et al. | |
| 5,992,923 A | 11/1999 | Wycech | |
| 5,997,077 A | 12/1999 | Siebels et al. | |
| 6,003,274 A | 12/1999 | Wycech | |
| 6,006,484 A | 12/1999 | Geissbuhler | |
| 6,033,300 A | 3/2000 | Schneider | |
| 6,059,342 A | 5/2000 | Kawai et al. | |
| 6,068,424 A | 5/2000 | Wycech | |
| 6,079,160 A * | 6/2000 | Bonds | 49/490.1 |
| 6,079,180 A | 6/2000 | Wycech | |
| 6,092,864 A | 7/2000 | Wycech et al. | |
| 6,096,403 A | 8/2000 | Wycech | |
| 6,099,948 A | 8/2000 | Paver, Jr. | |
| 6,103,341 A | 8/2000 | Barz et al. | |
| 6,114,004 A | 9/2000 | Cydzik et al. | |
| 6,119,418 A * | 9/2000 | Johnson | 52/223.7 |
| 6,131,897 A | 10/2000 | Barz et al. | |
| 6,141,930 A * | 11/2000 | Allwein et al. | 52/404.1 |
| 6,149,227 A | 11/2000 | Wycech | |
| 6,150,428 A | 11/2000 | Hanley, IV et al. | |
| 6,165,588 A | 12/2000 | Wycech | |
| 6,168,226 B1 | 1/2001 | Wycech | |
| 6,189,953 B1 | 2/2001 | Wycech | |
| 6,196,621 B1 | 3/2001 | VanAssche et al. | |
| 6,199,940 B1 | 3/2001 | Hopton et al. | |
| 6,233,826 B1 | 5/2001 | Wycech | |
| 6,237,304 B1 | 5/2001 | Wycech | |
| 6,247,287 B1 | 6/2001 | Takabatake | |
| 6,250,711 B1 * | 6/2001 | Takahara | 296/187.05 |
| 6,253,524 B1 | 7/2001 | Hopton et al. | |
| 6,263,635 B1 | 7/2001 | Czaplicki | |
| 6,267,436 B1 | 7/2001 | Takahara | |
| 6,270,600 B1 | 8/2001 | Wycech | |
| 6,272,809 B1 | 8/2001 | Wycech | |
| 6,276,105 B1 | 8/2001 | Wycech | |
| 6,281,260 B1 | 8/2001 | Hanley, IV et al. | |
| 6,287,666 B1 | 9/2001 | Wycech | |
| 6,296,298 B1 | 10/2001 | Barz | |
| 6,305,136 B1 | 10/2001 | Hopton et al. | |
| 6,311,452 B1 * | 11/2001 | Barz et al. | 52/735.1 |
| 6,315,938 B1 | 11/2001 | Jandali | |
| 6,319,964 B1 | 11/2001 | Balnk et al. | |
| 6,321,793 B1 | 11/2001 | Czaplicki et al. | |
| 6,332,731 B1 | 12/2001 | Wycech | |
| 6,341,467 B1 | 1/2002 | Wycech | |
| 6,357,819 B1 | 3/2002 | Yoshino | |
| 6,358,584 B1 | 3/2002 | Czaplicki | |
| 6,368,438 B1 | 4/2002 | Chang et al. | |
| 6,372,334 B1 | 4/2002 | Wycech | |
| D457,120 S | 5/2002 | Broccardo et al. | |
| 6,382,635 B1 | 5/2002 | Fitzgerald | |
| 6,383,610 B1 | 5/2002 | Barz et al. | |
| 6,389,775 B1 | 5/2002 | Steiner et al. | |
| 6,406,078 B1 | 6/2002 | Wycech | |
| 6,413,611 B1 | 7/2002 | Roberts et al. | |
| 6,419,305 B1 | 7/2002 | Larsen | |
| 6,422,575 B1 | 7/2002 | Czaplicki et al. | |
| 6,435,601 B1 | 8/2002 | Takahara | |
| H2047 H | 9/2002 | Harrison et al. | |
| 6,455,146 B1 | 9/2002 | Fitzgerald | |
| 6,467,834 B1 | 10/2002 | Barz et al. | |
| 6,471,285 B1 | 10/2002 | Czaplicki et al. | |
| 6,474,722 B1 | 11/2002 | Barz | |
| 6,474,723 B1 | 11/2002 | Czaplicki et al. | |
| 6,475,577 B1 | 11/2002 | Hopton et al. | |
| 6,482,486 B1 | 11/2002 | Czaplicki et al. | |
| 6,482,496 B1 | 11/2002 | Wycech | |
| 6,494,525 B1 * | 12/2002 | Blank | 296/187.02 |
| 6,502,821 B1 | 1/2003 | Schneider | |
| 6,519,854 B1 | 2/2003 | Blank | |
| 6,523,857 B1 | 2/2003 | Hopton et al. | |
| 6,523,884 B1 | 2/2003 | Czaplicki et al. | |
| 6,546,693 B1 | 4/2003 | Wycech | |
| 6,561,571 B1 * | 5/2003 | Brennecke | 264/277 |
| 6,573,309 B1 | 6/2003 | Reitenbach et al. | |
| 6,575,526 B1 | 6/2003 | Czaplicki et al. | |
| 6,607,238 B1 | 8/2003 | Barz | |
| 6,619,727 B1 * | 9/2003 | Barz et al. | 296/146.6 |
| 6,634,698 B1 | 10/2003 | Kleino | |
| 6,668,457 B1 | 12/2003 | Czaplicki | |
| 6,684,574 B1 * | 2/2004 | Hayashi | 49/490.1 |
| 6,715,592 B1 * | 4/2004 | Suzuki et al. | 188/371 |
| 6,777,049 B1 | 8/2004 | Sheldon et al. | |
| 6,786,533 B1 | 9/2004 | Bock et al. | |
| 6,793,274 B1 | 9/2004 | Riley et al. | |
| 6,820,923 B1 | 11/2004 | Bock | |
| 6,851,232 B1 | 2/2005 | Schwegler | |
| 6,887,914 B1 | 5/2005 | Czaplicki et al. | |
| 6,890,021 B1 | 5/2005 | Bock et al. | |
| 6,905,745 B1 | 6/2005 | Sheldon et al. | |
| 6,920,693 B1 | 7/2005 | Hankins et al. | |
| 6,921,130 B1 | 7/2005 | Barz et al. | |
| 6,923,499 B1 | 8/2005 | Wieber et al. | |
| 6,928,736 B1 | 8/2005 | Czaplicki et al. | |
| 6,932,421 B1 | 8/2005 | Barz | |
| 6,938,947 B1 | 9/2005 | Barz et al. | |
| 6,941,719 B1 | 9/2005 | Busseuil et al. | |
| 6,942,076 B1 * | 9/2005 | Suzuki et al. | 188/371 |
| 6,953,219 B1 | 10/2005 | Lutz et al. | |
| 6,955,593 B1 | 10/2005 | Lewis et al. | |
| 6,969,551 B1 | 11/2005 | Richardson et al. | |
| 7,004,536 B1 | 2/2006 | Wieber | |
| 7,011,315 B1 | 3/2006 | Czaplicki et al. | |
| 2001/0042353 A1 | 11/2001 | Honda et al. | |
| 2002/0033617 A1 * | 3/2002 | Blank | 296/187 |
| 2002/0053179 A1 | 5/2002 | Wycech | |
| 2002/0056242 A1 * | 5/2002 | Andresen | 52/220.8 |
| 2002/0066254 A1 | 6/2002 | Ebbinghaus | |
| 2002/0074827 A1 | 6/2002 | Fitzgerald et al. | |
| 2002/0088908 A1 | 7/2002 | Broccardo et al. | |
| 2002/0096833 A1 | 7/2002 | Czaplicki et al | |
| 2002/0125739 A1 * | 9/2002 | Czaplicki et al. | 296/187 |
| 2002/0164450 A1 | 11/2002 | Lupini et al. | |
| 2002/0174954 A1 | 11/2002 | Busseuil et al. | |
| 2003/0001469 A1 | 1/2003 | Hankins et al. | |
| 2003/0039792 A1 | 2/2003 | Hable et al. | |
| 2003/0042056 A1 | 3/2003 | Schneider et al. | |
| 2003/0050352 A1 | 3/2003 | Guenther et al. | |
| 2003/0057737 A1 | 3/2003 | Bock et al. | |
| 2003/0062739 A1 | 4/2003 | Bock | |
| 2003/0069335 A1 | 4/2003 | Czaplicki et al. | |

| | | | |
|---|---|---|---|
| 2003/0090129 A1 | 5/2003 | Riley et al. | |
| 2003/0140671 A1 | 7/2003 | Lande et al. | |
| 2003/0144409 A1 | 7/2003 | Kassa et al. | |
| 2003/0176128 A1 | 9/2003 | Czaplicki et al. | |
| 2003/0183317 A1 | 10/2003 | Czaplicki et al. | |
| 2003/0184121 A1 | 10/2003 | Czaplicki et al. | |
| 2003/0186049 A1 | 10/2003 | Czaplicki et al. | |
| 2003/0201572 A1 | 10/2003 | Coon et al. | |
| 2003/0209921 A1 | 11/2003 | Coon et al. | |
| 2003/0218019 A1 | 11/2003 | Le Gall et al. | |
| 2004/0011282 A1 | 1/2004 | Myers et al. | |
| 2004/0018341 A1 | 1/2004 | Richardson | |
| 2004/0018353 A1 | 1/2004 | Czaplicki et al. | |
| 2004/0034982 A1 | 2/2004 | Wieber et al. | |
| 2004/0036317 A1 | 2/2004 | Kleino | |
| 2004/0046423 A1 | 3/2004 | Wieber | |
| 2004/0056472 A1 | 3/2004 | Schneider | |
| 2004/0076831 A1 | 4/2004 | Hable et al. | |
| 2004/0084141 A1 | 5/2004 | Czaplicki | |
| 2004/0112531 A1 | 6/2004 | Bogert et al. | |
| 2004/0124553 A1 | 7/2004 | Czaplicki et al. | |
| 2004/0143969 A1 | 7/2004 | Czaplicki | |
| 2004/0212220 A1 | 10/2004 | Riley et al. | |
| 2004/0217626 A1 | 11/2004 | Barz et al. | |
| 2004/0227377 A1 | 11/2004 | Gray | |
| 2004/0256888 A1 | 12/2004 | Le Gall et al. | |
| 2004/0262810 A1 | 12/2004 | Barz et al. | |
| 2004/0262853 A1 | 12/2004 | Larsen et al. | |
| 2005/0012280 A1 | 1/2005 | Richardson | |
| 2005/0016807 A1 | 1/2005 | Braymand | |
| 2005/0017543 A1 | 1/2005 | Riley et al. | |
| 2005/0058787 A1 | 3/2005 | Ishikawa et al. | |
| 2005/0087899 A1 | 4/2005 | Coon et al. | |
| 2005/0126286 A1 | 6/2005 | Hable et al. | |
| 2005/0127145 A1 | 6/2005 | Czaplicki et al. | |
| 2005/0159531 A1 | 7/2005 | Ferng | |
| 2005/0166532 A1 | 8/2005 | Barz | |
| 2005/0172486 A1 | 8/2005 | Carlson et al. | |
| 2005/0194706 A1 | 9/2005 | Kosal et al. | |
| 2005/0212326 A1 | 9/2005 | Marion | |
| 2005/0212332 A1 | 9/2005 | Sheldon et al. | |
| 2005/0217785 A1 | 10/2005 | Hable et al. | |
| 2005/0218697 A1 | 10/2005 | Barz et al. | |
| 2005/0230165 A1 | 10/2005 | Thomas et al. | |
| 2005/0241756 A1 | 11/2005 | Harthcock et al. | |
| 2005/0249936 A1 | 11/2005 | Ui et al. | |
| 2005/0251988 A1 | 11/2005 | Mendiboure | |
| 2005/0260399 A1 | 11/2005 | Finerman | |
| 2005/0268454 A1 | 12/2005 | White | |
| 2005/0269840 A1 | 12/2005 | Finerman et al. | |
| 2005/0276970 A1 | 12/2005 | Busseuil et al. | |
| 2005/0285292 A1 | 12/2005 | Mendiboure et al. | |
| 2006/0000186 A1 | 1/2006 | Carlson et al. | |
| 2006/0006695 A1 | 1/2006 | Lutz et al. | |
| 2006/0008615 A1 | 1/2006 | Muteau et al. | |
| 2006/0019595 A1 | 1/2006 | Lewis et al. | |
| 2006/0020076 A1 | 1/2006 | Finerman et al. | |
| 2006/0021697 A1 | 2/2006 | Riley et al. | |
| 2006/0043772 A1 | 3/2006 | Richardson | |
| 2006/0057333 A1 | 3/2006 | Brahim | |
| 2006/0061115 A1 | 3/2006 | Brennecke | |
| 2006/0065483 A1 | 3/2006 | Thomas | |

FOREIGN PATENT DOCUMENTS

| | | |
|---|---|---|
| DE | 198 12 288 C1 | 5/1999 |
| DE | 198 56 255 C1 | 1/2000 |
| DE | 198 58 903 A1 | 6/2000 |
| EP | 0 383 498 A2 | 8/1990 |
| EP | 0 414 302 A1 | 9/1991 |
| EP | 0 679 501 A1 | 11/1995 |
| EP | 0 697 956 B1 | 2/1996 |
| EP | 0 611 778 B1 | 9/1997 |
| EP | 0 891 918 A1 | 1/1999 |
| EP | 0 893 331 A1 | 1/1999 |
| EP | 0 893 332 A1 | 1/1999 |
| EP | 1 006 022 A2 | 6/2000 |
| EP | 1 084 816 A2 | 3/2001 |
| EP | 1 134 126 B1 | 3/2001 |
| EP | 1 122 156 A2 | 8/2001 |
| EP | 1 006 022 B1 | 9/2003 |
| EP | 1 591 224 A1 | 2/2005 |
| EP | 1 157 916 B1 | 10/2005 |
| FR | 2115177 | 7/1972 |
| FR | 2 749 263 | 12/1997 |
| GB | 2 083 162 A | 3/1982 |
| GB | 2 156 412 A | 10/1985 |
| GB | 2 375 328 A | 11/2002 |
| JP | 10-45031 | 2/1998 |
| JP | 10-53156 | 2/1998 |
| JP | 10-71628 | 3/1998 |
| JP | 2000-52444 | 2/2000 |
| JP | 2001-662833 | 3/2001 |
| JP | 2001-88739 | 4/2001 |
| JP | 2001-199362 | 7/2001 |
| JP | 02001191949 A | 7/2001 |
| JP | 2002-120250 | 4/2002 |
| JP | 2002-362412 | 12/2002 |
| WO | WO 95/32110 | 11/1995 |
| WO | WO 97/02967 | 1/1997 |
| WO | WO 97/43501 | 11/1997 |
| WO | WO 98/50221 | 11/1998 |
| WO | WO 99/08854 | 2/1999 |
| WO | WO 99/28575 | 6/1999 |
| WO | 99/36243 | 7/1999 |
| WO | WO 99/48746 | 9/1999 |
| WO | WO 99/50057 | 10/1999 |
| WO | WO 00/13958 | 3/2000 |
| WO | WO 00/37302 | 6/2000 |
| WO | WO 00/40815 | 7/2000 |
| WO | WO 00/43254 | 7/2000 |
| WO | WO 00/46461 | 8/2000 |
| WO | WO 00/55444 | 9/2000 |
| WO | WO 01/19667 | 3/2001 |
| WO | WO 01/54936 | 8/2001 |
| WO | WO 01/71225 | 9/2001 |
| WO | WO 01/83206 | 11/2001 |
| WO | WO 01/88033 A1 | 11/2001 |
| WO | WO 03/042024 | 5/2003 |
| WO | WO 03/042024 A1 | 5/2003 |
| WO | WO 03/061934 | 7/2003 |
| WO | WO 03/78163 A1 | 9/2003 |
| WO | WO 05/105405 | 11/2005 |

OTHER PUBLICATIONS

Lilley et al., Comparison of Preformed Acoustic Baffles and Two-Component Polyurethane Foams for Filling Body Cavities, Apr. 2001 6 pages.
Lilley et al., A Comparison of NVH Treatments for Vehicle Floorplan Applications, Apr. 2001 8 pages.
Lilley et al., Vehicle Acoustic Solutions, May 2003 8 pages.
Mansour et al., Optimal Bonding Thickness for Vehicle Stiffness, Apr. 2001, 6 pages.
European Search Report dated Feb. 1, 2006. Application No. 03076320.5 (1001.097EP).

* cited by examiner

MULTI SEGMENT PARTS

The present application claims priority to and the benefit of the filing date of Great Britain Application Serial No. 0211775.2 (filed May 23, 2002), hereby incorporated by reference.

The present invention relates to materials useful for structural reinforcement of cavities and also as sound reducing baffles.

In particular the invention relates to reinforcing materials that can be provided in hollow cross-sectional members to provide reinforcement to improve the structural integrity of vehicles, construction materials, aircraft, ships and railroad applications and/or to produce a sound deadening effect in vehicles, construction materials, aircraft and ships. The invention further provides a system whereby reinforcement and/or a sound deadening effect can be provided whilst ensuring effective provision of an anti-corrosion coating on the inner surface of the hollow cross-sectional member by the electrocoat process used in automobile construction. The electro-coat process is a process in which a metal structure is passed through a bath of anticorrosion fluid and the structure is used as an electrode whereby an anticorrosion coating is deposited from the fluid onto the vehicle structure by electrolysis. The anticorrosion coating is subsequently secured on the structure by baking in an oven.

The trends in motor vehicle, aircraft, ship and construction material design are towards lighter structures, which with vehicles, aircraft and ships leads to improved fuel consumption. At the same time safety standards and requirements are becoming more rigorous as indicated by the European Union requirements and the Euro-NCAP impact testing. The use of lighter materials such as aluminium to produce the hollow cross-sectional members that are used as vehicle sub frames has lead to the need for additional reinforcement.

There is a need for reinforcement in various positions in a vehicle structure including the sub frame and upper structure and the form of reinforcement required can vary from one location in the vehicle to another and from vehicle to vehicle. In one aspect the present invention therefore improves the strength of vehicle structures made from existing materials and enhances the safety of vehicle structures based on lighter materials.

There are four main types of application where structural reinforcement is required in vehicles. Crash protection where the prevention of vehicle body deformation is important to provide protection for the occupants. Energy absorption to enhance performance after yield. The reduction of flexing or body movement in the vehicle structure particular to improve durability and reduce stress cracking and the point mobility problems requiring the reduction of resonance by the provision of stiffening. The need for reinforcement is present irrespective of the materials that are used to produce the vehicle structure and the need varies from material to material according to the nature of the reinforcement that is being provided. There is also a need to reduce the noise created by the motion of vehicles, ships, aircraft and construction materials by providing sound deadening by blocking air paths in cavities. The materials provided by the present invention can therefore provide reinforcement, they can act as acoustic baffles or they can serve both functions.

It is known to provide longitudinal reinforcing structures within the hollow cross sections of vehicles. For example, PCT Publication WO97/43501 provides a beam, which can be mounted within the cross section to provide reinforcement along one axis in a hollow structure. The beam is provided with an expandable adhesive on two surfaces, which can be foamed upon heating to bond the beam to two opposed walls of the cross section. However, the beam will only provide significant reinforcement along the axis of the beam. In WO97/43501 the beam with foamable material on opposed surfaces is placed in the cavity and subsequently foamed under the action of heat. This will result in uneven foaming and to non-uniform foam structures since on the underside because the foam must raise the weight of the beam whereas expansion on the topside is free.

It is also known to provide foamable plastic mouldings within the hollow cross sections which can be foamed upon application of heat, such as is provided in the baking oven in the electrocoat process, to provide a foamed baffle that fills the cross-section to provide either structural reinforcement or sound adsorption. Such systems are described in European patent applications 0383498 and 0611778. The foam baffle provides sound deadening and vibration resistance. In these systems the entire insert is foamable and it is proposed that the foamable material be chosen so that it will foam during the baking process, which follows the electrocoat process typically used in vehicle manufacture to provide resistance to metal corrosion. The materials of these patents are primarily used to provide acoustic baffles and seals.

In the electro-coat process a vehicle structure is immersed in a bath of coating fluid from which an anticorrosion coating is deposited on the metal by electrolysis. The vehicle metal structure is subsequently heated to bake the coating on the metal. The electrocoat process is typically applied to complete vehicle structures in which hollow sections have been capped. Accordingly any reinforcing structures are preferably provided within hollow sections prior to the electrocoat. It is therefore important that the reinforcing structure have minimal impact on the operation and efficiency of the electrocoat process.

It has also been proposed that structural reinforcement, particularly in vehicles, may be achieved by providing a reinforcing core coated with an expandable adhesive. This structural reinforcement may be appropriately positioned in the hollow vehicle structure. The vehicle structure containing the structural reinforcement with the expandable adhesive in its unexpanded state may then be subjected to the e coat anticorrosion process. The expandable adhesive may then be selected so that it will foam under the conditions in the bake oven of the e coat process to fill the gap between the reinforcing core and the internal surface of the hollow vehicle structure and also for a rigid bond there between.

The structural reinforcing and/or sound deadening parts that have been provided hitherto are based on a rigid core with a foamable coating thereon. It is therefore difficult with these materials to reinforce sections that contain bends or are of variable cross section. Furthermore, they are generally not suitable for the reinforcement of sections of small cross section such as some of the sections found in the A, B and C pillars of automobiles.

There is therefore a need to provide structural reinforcement and/or acoustic baffles for the hollow cross-sections of vehicles, which are easily supplied, may be readily used in sections that contain bends or are of narrow and/or variable cross section and which work well within the bounds of the electrocoat process. Where structural reinforcement is to be provided the part must provide effective reinforcement to the vehicle both during vehicle operation and as crash protection.

The present invention therefore provides a member comprising at least two interconnected segments each segment comprising a support member defining a cavity within the support member and containing a foamable material within said cavity the segments being connected in a manner that enables flexible movement of the segments relative to each other.

The preferred members comprise at least three and more preferably at least four interconnected segments.

In a preferred embodiment the cavity within the support member contains ribs which define spaces for and support the foamable material. The ribs also provide additional reinforcement and help to guide the expansion of the foamable material.

In a further embodiment of the invention the foamable material fills the spaces defined by the ribs.

In a further embodiment of the invention a small plate, preferably a circular plate is provided in the cavity which supports the foamable material within the cavity. The plate reduces the bending of the ribs during injection of the foamable material. It is also preferred that the plate is integral with the ribs so that the ribs and the plate provide a structure within the cavity which supports and directs the foamable material particularly during foaming when it can be in the form of a low viscosity liquid.

In a yet further embodiment of the invention the member is provided with clips to enable it to be attached to the surface of the structure. The location of the clips and the number of segments in the reinforcing member will depend upon the nature and shape of the structure to be reinforced. Alternatively, the part may be adhered to the structure or the structure itself may be provided with means for attachment.

In yet another embodiment of the invention at least part of the internal walls of the support member, which defines the cavity, are provided with an internally facing lip which supports the foamable material and supports and directs the material as it foams. Preferably the lip is provided on all the internal walls.

The member may also be provided with small lugs, which enable it to stand away from the interior walls of the sections of the vehicle. In this way the fastening devices previously described are not required and the area of contact between the member and the interior walls of the frame of the vehicle is minimised. The clearance between the extremity of the member and the interior walls of the frame of the vehicle is preferably wide enough to enable the liquid used in the electrocoat bath to flow between the member and the interior walls of the sections of the vehicle in sufficient quantity to enable an effective anti-corrosion coating to be deposited. On the other hand, the clearance must not be too wide since this can result in a lack of rigidity in the structure when the expandable adhesive is foamed to fill the clearance and bond the member to the interior walls of the frame of the vehicle. We prefer that the clearance be no more than 1 centimeter and is more preferably 3 to 10 millimeters. A clearance around the whole structure enables a more uniform foam structure to be obtained.

The invention can be used to provide structural reinforcement and/or sound deadening. The materials from which the member is made will be chosen according to the effect the part is to impart. In a preferred embodiment the invention provides structural reinforcement and it will now be described in relation to that embodiment.

The reinforcing member may be made from any suitable material, for example it may be made of metal or plastic and the material will be chosen according to the preferred fabrication method. This in turn is driven by economics and the complexity of the cross section to be reinforced. Reinforcing members for simple cross sections may be prepared by extrusion whilst injection moulding may be required for more complex structures. Metal members may be produced by stamping and/or forming. Where extrusion is used the members may be of metal or thermoplastics; where injection moulding is used thermoplastics are preferred. Polyamides, particularly glass filled polyamides are suitable materials due to their high strength to weight ratio. Alternatively injection moulding or die casting of metal alloys may be employed. Injection moulding is particularly preferred because this allows the segments to be moulded together with an integrally moulded, flexible, interconnecting piece to provide the desired degree of flexibility.

The member of the present invention may be of any thickness, although the invention is most useful in thin and/or narrow cross sections particularly those with bends when it will also be relatively thin. The flexible nature of the links between the segments allows the member to be manipulated to match the contours of the section to be reinforced or the cavity wherein it is desired to provide reinforcement and/or an acoustic baffle. The preferred shape and structure of the member will depend upon where it is to be located in the vehicle structure and the function it is to perform. For example, if it is to be located in the front longitudinal section of the vehicle it will be designed for crash or impact resistance. On the other hand, it may be designed to reduce point mobility such as for example at the base of side and rear pillars. This is particularly important with high-sided vehicles where the reinforcement can reduce or prevent vehicle sway thus reducing metal fatigue. Other applications include the resistance of deformation of the rear longitudinal section, in particular to prevent upward deformation from rear impact, which can prevent the doors from being opened thus trapping the occupants. Parts of the vehicle which may be reinforced by the techniques of the present invention include roof structures, pillars, such as the A pillar, B pillar or C pillar, frame cross members and window frames particularly rear window frames.

The expandable adhesive material serves two main functions, it will expand to fill the space between the reinforcing member and the interior of the vehicle structure and it will also bond to the interior wall of the structure. Accordingly, expandable adhesive material means that the material can be activated to both expand (typically foam) and to act as an adhesive. Activation therefore enables the expandable material to expand out of the support member of the segment and bridge the gap between the reinforcing member and the hollow structure it is designed to reinforce and also to bond to the internal surface of the hollow structure. Accordingly, in order to provide reinforcement the expandable adhesive must expand at the desired temperature and be sufficiently adhesive to firmly bond the reinforcing member inside the vehicle structure. Once foamed it should be sufficiently strong that it does not contribute any weakness to the overall reinforcing effect provided.

Prior to activation, the expandable adhesive material is preferably dry and not tacky to the touch, since this facilitates shipping and handling and prevents contamination. Examples of preferred foamable materials for the production of reinforcing materials include foamable epoxy-base resins and examples of such materials are the products L5206, L5207, L5208 and L5209, which are commercially available from L & L Products of Rome Mich. USA, and the Betacore Products BC 5204, 5206, 5205 and 5208 available from Core Products, Strasbourg, France. The product should be chosen according to the rate of expansion and foam densities required. It is further preferred that it expand at the temperatures experienced in the electrocoat baking oven, typically 130° C. to 200° C., preferably 130° C. to 150° C. If the invention is to be used to provide acoustic baffles the expandable material may be a thermoplastic such as copolymer of ethylene and vinyl acetate or an ethylene acrylate copolymer.

It is preferred that the reinforcing member is located within the hollow member that it is designed to reinforce in a manner that provides a clearance between the external surface of the member and the internal surface of the hollow member. This allows for the passage of the electrocoat fluid between the member and the internal surface and also enables a uniform expansion of the foam around the member to provide more uniform reinforcement. Accordingly in a preferred process for providing reinforcement within hollow structures such as a vehicle frame, moulded reinforcing members containing the foamable adhesive are installed during assembly of the vehicle frame prior to the frame being subjected to the e coat process.

Means are preferably provided to position the moulded reinforcing members away from the surface so that the anticorrosion fluid can reach all parts of the surface. These means may be clips or other fastenings which hold the member away from the surface. The clips may be formed on the surfaces or on the moulded reinforcing member itself or both. Alternatively locating lugs may be moulded into the reinforcing member so that the reinforcing member sits within the vehicle structure leaving a space between the member and the interior walls of the cavity to be reinforced, in this way there is no need for fastening or bonding means to attach the member to the interior walls. The assembled structure may then be subjected to the electrocoat process in which it is passed through a bath of coating material and a corrosion resistant coating is deposited onto the structure by electrolysis. The vehicle structure is then dried in an oven to provide the final anticorrosion coating. The expandable adhesive is preferably chosen so that it is activated by the drying conditions used in the oven employed to bake the coating on the electrocoat process. In this way the expandable material will expand under the drying conditions to provide a foam that fills the space between the member and the interior walls to produce a bond between the reinforcing member and the interior wall. Typically the coated structure is dried at around 165° C. for about 20 minutes and accordingly the adhesive should expand under these conditions. The industry is however looking to use lower drying temperatures and shorter drying times and this may influence the choice of expandable adhesive materials.

The techniques of the present invention may be used for the reinforcement of any construction that is based on a hollow frame structure. They may for instance be used in the construction industry, in boats, in aircraft, and in railroad applications. They are however particularly useful to provide reinforcement in automobiles including cars, trucks, caravans and the like. The techniques are particularly useful in the current trend towards using lighter and sometimes weaker materials in the production of automobile sub frames where there is a greater need for reinforcement to compensate for the reduction in strength of the basic material and yet satisfy the safety requirements. This is particularly the case with the use of aluminium for the production of automobiles. The invention readily enables reinforcement to be provided in narrow or non-uniform or non-linear hollow sections which has hitherto been difficult to achieve.

The present invention is illustrated by reference to the accompanying drawings in which FIG. 1 shows a part consisting of three interconnected segments without any expandable material present to illustrate the structure of the segments.

Figure 1:
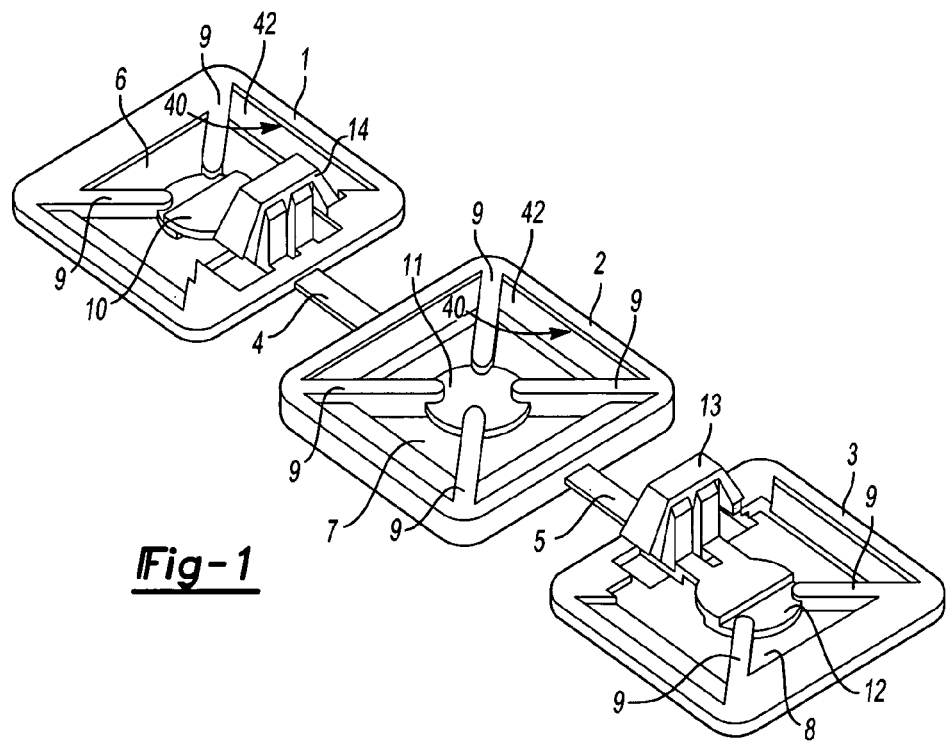

FIG. 1 shows a part according to the present invention made by injection moulding of glass filled nylon consisting of three segments (1), (2) and (3) linked by flexible interconnecting members (4) and (5). Each segment consists of a rectangular member defining a space (6), (7) and (8) ribs (9) are formed extending into the space defined by the rectangular members, the ribs are integrally moulded with plates shown as discs or plates (10), (11) and (12). The part illustrated in FIG. 1 also contains two integrally moulded clips (13) and (14) which can be used to attach the part to the surface of the structure that is to be reinforced. The clips are designed to hold the part away from the surface of the structure. The part illustrated in FIG. 1 also includes internal walls 40 and an internally facing lip 42 as discussed above.

Figure 2:
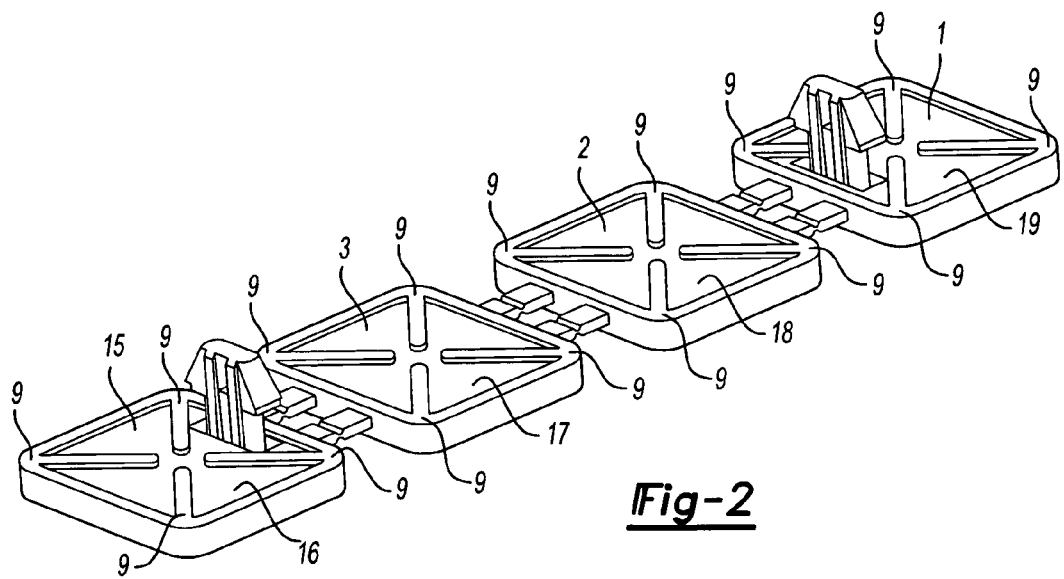
FIG. 2 shows a four segment part similar to FIG. 1 but with the expandable material being present.

FIG. 2 shows a four segment part similar to FIG. 1 with an additional segment (15). The foamable material (16), (17) (18) and (19) present in the spaces provided by the segments.

Figure 3:
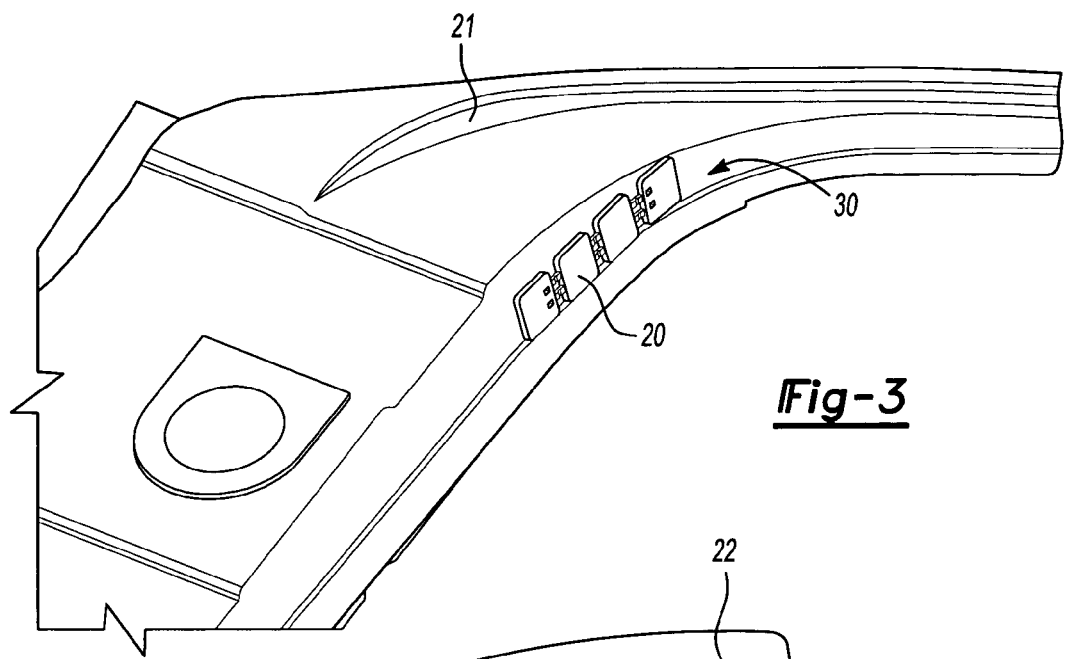
FIG. 3 shows a part according to the present invention attached to the interior surface of a hollow section of the A pillar of an automobile prior to foaming of the expandable material.
Figure 4:
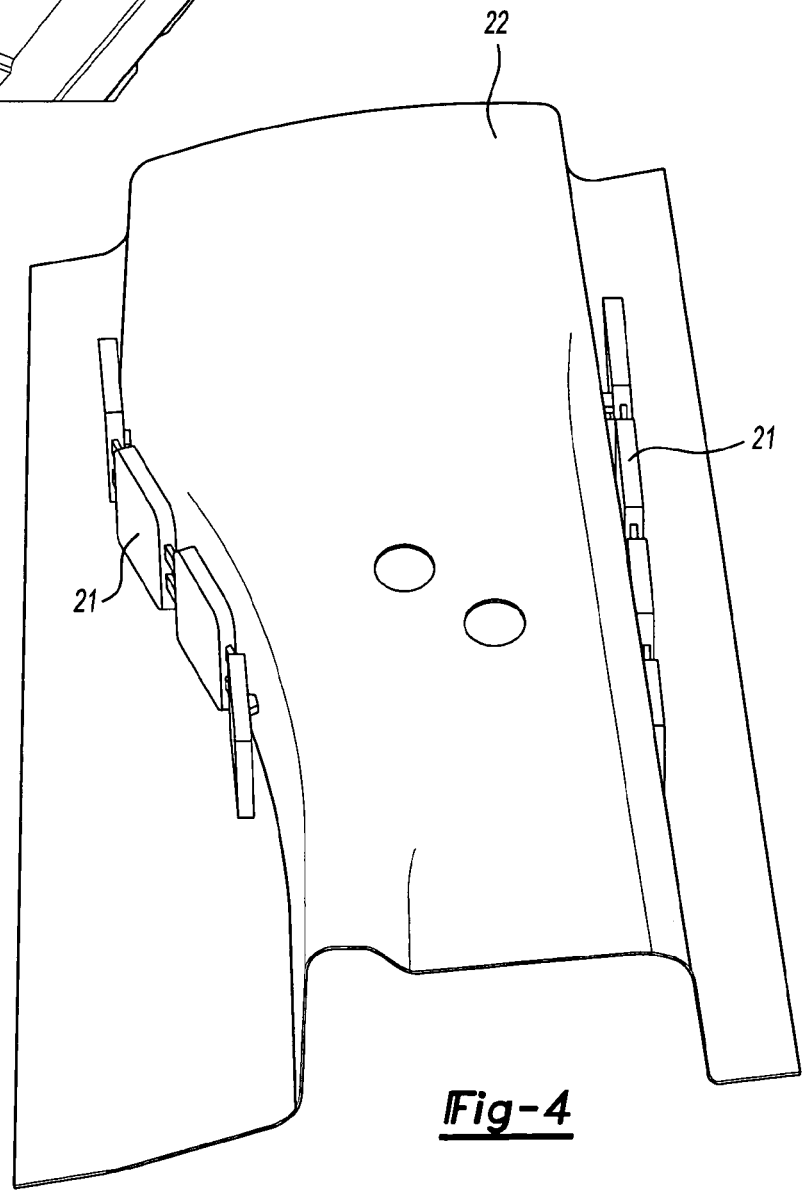
FIG. 4 shows a part according to the present invention attached to the interior surface of a hollow section of the B pillar of an automobile prior to expansion of the expandable material.

FIG. 3 shows an unfoamed four segment part (20) similar to the part of FIG. 2, mounted within a hollow structure shown as the A pillar (19) of a vehicle and FIG. 4 shows two such four segment parts (20) mounted in a front longitudinal section (22) of a vehicle. FIG. 4 shows how the compact nature of the part enables it to be mounted in a narrow cavity (30) (e.g., a narrow gap) in the vehicle structure and it also shows how the flexible nature of the interconnecting elements enables the part to be manoeuvred to match the contoured profile of the vehicle structure.

The vehicle section with the part of this invention attached thereto may then be assembled into the vehicle body. The assembled body may then be subjected to the e coat process and finally baked. Accordingly providing the nature of the foamable material is selected so that it will foam during the baking step it will expand to fill the cavity and provide the desired structural reinforcement and/or acoustic baffle.

The invention therefore provides a convenient and flexible technique for the provision of structural reinforcement and/or noise abatement in hollow cross sections that are too small for the application of pre-existing techniques or are of variable and/or non-straight cross section.

The invention claimed is:

1. A member for insertion into a hollow structure of an automotive vehicle, comprising:
   at least two interconnected segments each segment comprising a support member defining an internal cavity within the support member and containing a foamable material within said cavity, the segments being connected in a manner that enables flexible movement of the segments relative to each other, the segments being relatively thin for allowing insertion of the segments into a narrow gap of the hollow structure and in which a plate is provided in the cavity which supports the foamable material within the cavity.

2. A member according to claim 1, wherein the cavity within the support member contains ribs which define spaces for and support of the foamable material.

3. A member according to claim 2, in which the foamable material fills the spaces defined by the ribs.

4. A member according to claim 1, in which the plate is integral with the ribs so that the ribs and the plate provide a structure within the cavity which supports the foamable material and directs the foamable material during foaming.

5. A member according to claim 1, provided with clips to enable it to be attached to the surface of the structure.

6. A member according to claim 1 in which at least part of the internal walls of the support member, which define the cavity, are provided with an internally facing lip which supports the foamable material and supports and directs the material as it foams.

7. The member of claim 1, wherein the interconnected segments are made of a metal.

8. A member according to claim 1 wherein the at least two interconnected segments are interconnected with a flexible interconnecting element.

9. A member according to claim 8 wherein the at least two interconnected segments include at least three interconnected segments flexibly interconnected with flexible interconnecting elements.

10. A member according to claim 9 wherein the support members of each of the segments substantially surround the foamable material within the cavities of the segments.

11. A member according to claim 10 wherein the foamable material is substantially dry and non-tacky to the touch.

12. A member according to claim 11 wherein the support member of each of the at least three interconnected segments is formed of a polyamide.

13. A member according to claim 12 wherein the at least three interconnected segments are adapted for insertion into a contoured pillar of an automotive vehicle by virtue of the flexible movement of the interconnected segments relative to each other.

14. A member for insertion into a hollow structure of an automotive vehicle, comprising:
at least three segments that are made of a material selected from metal or plastic, each segment supporting a foamable material, and being connected in a manner that enables flexible movement of the segments relative to each other, a flexible interconnecting element located between the segments and linking the segments, at least one clip adapted for attaching the member to a surface, wherein the member is adapted for structural reinforcement, noise abatement, or a combination thereof.

15. The member of claim 14, wherein the segments include ribs for supporting the foamable material.

16. The member of claim 14, wherein the foamable material is disposed in a cavity defined in the segments.

17. The member of claim 14, wherein prior to activation for foaming, is dry and not tacky to the touch.

18. A member according to claim 14 wherein:
i. the foamable material expands and forms a foam at temperatures experienced in a bake oven of an e-coat process for an automotive vehicle; and
ii. the support members are formed of a thermoplastic.

19. A member for insertion into a hollow structure of an automotive vehicle, comprising:
at least two interconnected segments each segment comprising a support member defining an internal cavity within the support member and containing a foamable material within said cavity, the segments being connected in a manner that enables flexible movement of the segments relative to each other, the segments being relatively thin for allowing insertion of the segments into a narrow gap of the hollow structure and in which at least part of the internal walls of the support member, which define the cavity, are provided with an internally facing lip which supports the foamable material and supports and directs the material as it foams.

20. A member according to claim 19, wherein the cavity within the support member contains ribs that support the foamable material and which define spaces in which the foamable material is located.

21. A member according to claim 20, in which a plate is provided in the cavity which supports the foamable material and in which the plate is integral with the ribs so that the ribs and the plate provide a structure within the cavity which supports the foamable material and directs the foamable material during foaming.

22. A member according to claim 19, provided with clips to enable it to be attached to the surface of the structure.

23. A member according to claim 19 wherein the member is configured to provide clearance between the external surface of the member and the internal surface of a hollow structure when located within the hollow structure.

24. A member according to claim 19 wherein the foamable material is configured to foam in a drying oven that dries electrocoat.

25. A member according to claim 19 wherein the foamable material is configured to foam in a drying oven that dries electrocoat.

26. A member for location within an automotive vehicle, comprising:
at least two interconnected segments each segment comprising a support member defining a cavity within the support member and containing a foamable material within said cavity wherein:
i. the segments are connected by a flexible interconnecting member in a manner that enable flexible movement of the segments relative to each other by bending or flexing of the flexible interconnecting member;
ii. the cavity within at least one of the support members contains ribs that support the foamable material and that define spaces in which the foamable material is located.

27. A member according to claim 26 in which a small plate is provided in the cavity which supports the foamable material within the cavity.

28. A member according to claim 26 in which the plate is integral with the ribs so that the ribs and the plate provide a structure within the cavity which supports the foamable material and directs foamable material during foaming.

29. A member according to claim 26 in which the member includes a clip attached to at least one of the at least two segments.

30. A member according to claim 26 wherein the segments are located within a hollow structure of an automotive vehicle.

31. A member according to claim 30 wherein the flexible interconnecting member flexes about a contour defined by the structure.

32. A member according to claim 26 wherein clips attach the segments to a structure of an automotive vehicle.

33. A member according to claim 26 wherein the support members of each of the segments include a peripheral portion that substantially surrounds the foamable material within the cavities of the segments.

34. A member according to claim 26 in which at least part of the internal walls of the support member, which define the cavity, are provided with an internally facing lip which supports the foamable material and supports and directs the material as it foams.

35. A member according to claim 26 in which the support members are formed of plastic.

36. A member according to claim 35 wherein the support member and flexible interconnecting member are integrally formed of the plastic.

37. A member according to claim 36 wherein the plastic is nylon.

38. A member according to claim 26 in which:
i. the member includes clips attached to the at least two segments;
ii. the segments are located within a hollow structure of an automotive vehicle;
iii. the flexible interconnecting member flexes about a contour defined by the structure;
iv. the clips attach the segments to a structure of an automotive vehicle;
v. the support members of each of the segments include a peripheral portion that substantially surrounds the foamable material within the cavities of the segments;
vi. the support members and the interconnecting member are integrally formed of nylon.

* * * * *

UNITED STATES PATENT AND TRADEMARK OFFICE
CERTIFICATE OF CORRECTION

PATENT NO.       : 7,144,071 B2                                      Page 1 of 1
APPLICATION NO.  : 10/430964
DATED            : December 5, 2006
INVENTOR(S)      : Eric Le Gall et al.

It is certified that error appears in the above-identified patent and that said Letters Patent is hereby corrected as shown below:

Column 8, Line 49, replace "26" with --27--.

Signed and Sealed this

Tenth Day of April, 2007

JON W. DUDAS
*Director of the United States Patent and Trademark Office*